US009151089B2

(12) United States Patent
Aerts et al.

(10) Patent No.: US 9,151,089 B2
(45) Date of Patent: Oct. 6, 2015

(54) CONTROLLER APPARATUS AND SENSORS FOR A VEHICLE DOOR HANDLE

(71) Applicant: Tesla Motors, Inc., Palo Alto, CA (US)

(72) Inventors: Joris Aerts, San Francisco, CA (US); Adam S. Kilgore, San Rafael, CA (US); Brenda Cucci, San Carlos, CA (US); Ian Craven, San Carlos, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 372 days.

(21) Appl. No.: 13/627,903

(22) Filed: Sep. 26, 2012

(65) Prior Publication Data

US 2013/0079984 A1 Mar. 28, 2013
US 2015/0039180 A9 Feb. 5, 2015

Related U.S. Application Data

(60) Provisional application No. 61/539,499, filed on Sep. 27, 2011, provisional application No. 61/539,203, filed on Sep. 26, 2011, provisional application No. 61/539,337, filed on Sep. 26, 2011, provisional application No. 61/539,580, filed on Sep. 27, 2011.

(51) Int. Cl.

| | |
|---|---|
| ***G06F 7/00*** | (2006.01) |
| ***E05B 85/10*** | (2014.01) |
| ***E05B 85/18*** | (2014.01) |
| ***G07C 9/00*** | (2006.01) |
| *E05B 1/00* | (2006.01) |
| *E05B 79/06* | (2014.01) |
| *E05B 81/54* | (2014.01) |

(52) U.S. Cl.

CPC ............. *E05B 85/103* (2013.01); *E05B 85/107* (2013.01); *E05B 85/18* (2013.01); *G07C 9/00944* (2013.01); *E05B 1/00* (2013.01); *E05B 79/06* (2013.01); *E05B 81/54* (2013.01); *Y10T 292/57* (2015.04)

(58) Field of Classification Search

USPC .......................... 701/36; 292/336.3; 340/5.72

See application file for complete search history.

(56) References Cited

U.S. PATENT DOCUMENTS 2,017,244 A 10/1935 Gunmundsen
5,123,687 A 6/1992 Pfeiffer et al.

(Continued)

FOREIGN PATENT DOCUMENTS

DE 19833168 A1 2/2000
GB 453333 9/1936

(Continued)

*Primary Examiner* — Tuan C. To
*Assistant Examiner* — Isaac Smith
(74) *Attorney, Agent, or Firm* — J. Richard Soderberg

(57) ABSTRACT

In a vehicle door assembly, controllers processes signals from an extension force sensor and a retraction force sensor to control a door handle. As a motor retracts the handle, a swing arm in the vehicle door presses against the retraction force sensor causing the handle controller to stop the motor. Pushing on the retracted handle presses the swing arm against the retraction force sensor a second time causing the controllers to operate the motor and extend the handle. As the handle extends, the swing arm presses against the extension force sensor and the handle controller stops the motor as the handle is fully extended. Subsequently, a hand pulling on the door handle presses the swing arm against the extension force sensor a second time causing the controllers to unlatch a latch holding the vehicle door shut, and thereby allow the vehicle door to open.

19 Claims, 13 Drawing Sheets

(56) References Cited

U.S. PATENT DOCUMENTS

| | | | | |
|---|---|---|---|---|
| 5,305,969 | A | 4/1994 | Odell et al. | |
| 5,632,516 | A | 5/1997 | Schwab | |
| 5,844,470 | A | 12/1998 | Garnault et al. | |
| 6,062,614 | A | 5/2000 | Petzold | |
| 6,072,403 | A | 6/2000 | Iwasaki et al. | |
| 6,094,131 | A * | 7/2000 | Chen et al. | 340/426.36 |
| 6,429,782 | B2 | 8/2002 | Pavatich et al. | |
| 6,698,262 | B2 | 3/2004 | Wittwer | |
| 6,843,084 | B2 | 1/2005 | Porter | |
| 7,445,257 | B2 | 11/2008 | Muller et al. | |
| 7,621,573 | B2 * | 11/2009 | Thomas et al. | 296/1.02 |
| 8,047,583 | B2 | 11/2011 | Clausen | |
| 8,403,265 | B2 | 3/2013 | Gowing et al. | |
| 8,443,553 | B1 | 5/2013 | Polewarczyk et al. | |
| 8,701,353 | B2 | 4/2014 | Patel et al. | |
| 8,733,815 | B2 | 5/2014 | Kwon | |
| 8,833,190 | B2 | 9/2014 | Hsu et al. | |
| 8,919,047 | B2 | 12/2014 | Johnsrud et al. | |
| 2003/0182863 | A1 | 10/2003 | Mejean et al. | |
| 2004/0177478 | A1 | 9/2004 | Louvel | |
| 2007/0126246 | A1 | 6/2007 | Suzuki et al. | |
| 2008/0021619 | A1 | 1/2008 | Steegmann et al. | |
| 2008/0061933 | A1 | 3/2008 | Ieda et al. | |
| 2008/0163555 | A1 | 7/2008 | Thomas et al. | |
| 2008/0290668 | A1 | 11/2008 | Ieda et al. | |
| 2008/0314097 | A1 | 12/2008 | Rohlfing et al. | |
| 2009/0039671 | A1 | 2/2009 | Thomas et al. | |
| 2009/0243319 | A1 | 10/2009 | Browne et al. | |
| 2010/0127516 | A1 | 5/2010 | Fannon | |
| 2011/0018056 | A1 | 1/2011 | Takeuchi | |
| 2011/0148575 | A1 * | 6/2011 | Sobecki et al. | 340/5.64 |
| 2012/0119524 | A1 | 5/2012 | Bingle et al. | |
| 2013/0076048 | A1 | 3/2013 | Aerts et al. | |
| 2013/0127185 | A1 | 5/2013 | Lang et al. | |
| 2013/0147213 | A1 | 6/2013 | Muller et al. | |
| 2014/0022811 | A1 | 1/2014 | Wheeler et al. | |
| 2014/0069015 | A1 | 3/2014 | Salter et al. | |

FOREIGN PATENT DOCUMENTS

| | | | |
|---|---|---|---|
| GB | 2477085 | A * | 7/2011 |
| SE | 521632 | C2 * | 11/2003 |

* cited by examiner

CONTROLLER APPARATUS AND SENSORS FOR A VEHICLE DOOR HANDLE

(1) CROSS-REFERENCE TO RELATED APPLICATIONS

This application claims the benefit of: (1) U.S. Provisional Application No. 61/539,203, filed Sep. 26, 2011, entitled, “DOOR RELEASE LATCH UTILIZING A CAPACITIVE SENSOR” by Wheeler et. al, (2) U.S. Provisional Application No. 61/539,337, filed Sep. 26, 2011, entitled, “SINGLE SOURCE DUAL PURPOSE, VEHICLE DOOR HANDLE ILLUMINATOR” by Wheeler et. al, (3) U.S. Provisional Application No. 61/539,499, filed Sep. 27, 2011, entitled, “ELECTRO-MECHANICAL SWITCH ASSEMBLY FOR EXTERIOR VEHICLE DOOR HANDLE” by Wheeler et. al, (4) U.S. Provisional Application No. 61/539,580, filed Sep. 27, 2011, entitled, “SELF-DEPLOYING OUTSIDE DOOR HANDLE” by Wheeler et. al, assigned to the assignee of this application and incorporated by reference herein for all purposes. Each of the above-referenced patent applications is incorporated by reference herein for all purposes.

(2) TECHNICAL FIELD

The subject matter described herein concerns exterior features used on a vehicle, and more particularly to the controller and sensors used in a vehicle door handle.

(3) DESCRIPTION OF THE RELATED ART

Most modern vehicles require some type of exterior door handle to open and close the vehicle doors. The conventional exterior door handle is mounted over a recessed area in the door creating a finger opening or place to insert one’s hand while unlocking and opening the door. The exterior door handle spans this recessed area in the door and incorporates a mechanical hinge, a paddle, or other mechanical actuator to engage the latch and open the door. As the exterior door handle pivots on the mechanical actuator, the door latch mechanism for the vehicle door is actuated causing the door to unlatch and open.

Generally, the conventional mechanical door handle also has a corresponding interior mechanical assembly mounted within the interior of the door. This interior mechanical assembly may incorporate rods, flanges, or other mechanical components to engage a lock mechanism for locking/unlocking the door and/or a latch mechanism to open the door. In addition to the interior mechanical assembly for the door handle, the interior of the door may also need room for a retracted glass window and the corresponding mechanical or electromechanical components for moving the window up and down.

To accommodate different vehicle door designs, it is useful to have more room on the interior of the door. With additional room, the vehicle door may be equipped with more sophisticated door handles, stronger structural support, a more streamlined profile, or other features. This may be accomplished by reducing the size of the interior mechanisms or by replacing the mechanical assemblies in part or in whole with controllers and electronics.

SUMMARY

Aspects of the disclosure provide a door handle assembly used in a vehicle and controlled using a controller and one or more sensors. When not in use, a door handle in the door handle assembly is retracted into the door with a planar surface of the door handle remaining flush with the outer surface of the door. When a person pushes in on the flush door handle, a retraction force sensor in the door handle assembly detects the inward force, and the controller responds by instructing a motor to extend the door handle. If a hand pulls on the extended handle, an extension force sensor detects the pulling force and the controller responds by instructing a latch on the door to unlatch and open the door.

In some embodiments, the door handle assembly includes a door handle formed from a planar handle member having a first post portion and a second post portion. An upper portion of a swing arm located in the interior of the vehicle door is connected near a distal portion of the first post portion of the door handle and a distal portion of the second post portion of the door handle. The lower portion of the swing arm is rotably attached to a shaft mounted to an inner door surface of the vehicle door allowing the swing arm to pivot between an extended position and a retracted position. An extension force sensor fixedly attached to the inner door surface of the vehicle door generates an extension force response signal when the extension force sensor comes into contact with the upper portion of the swing arm. A retraction force sensor fixedly attached to the lower portion of the swing arm generates a retraction force response signal when the retraction force sensor on the lower portion of the swing arm comes into contact with a flush adjuster rod. A handle controller processes both the extension force response signal received from the extension force sensor and the retraction force response signal received from the retraction force sensor in controlling the operation of the door handle in the door handle assembly.

To facilitate the door handle retracting into the vehicle door, the handle controller runs a motor operatively coupled to a door handle. As the door handle retracts, the swing arm coupled to the door handle also retracts into the vehicle door and presses against the retraction force sensor with a first retraction force—this creates a first retraction force signal response. The handle controller may stop the motor if the first retraction force signal indicates the door handle is fully retracted. In some embodiments, the handle controller determines the door handle is retracted when the first retraction force corresponding to the first retraction force signal is greater than a retraction stop threshold. Subsequently, the handle controller may receive and process a second retraction force signal response as a result of an inward push on the door handle and the swing arm pressing against the retraction force sensor a second time. In response to the second retraction force signal, the handle controller instructs the motor operatively coupled to the door handle to facilitate extending the door handle from the retracted position into an extended position from the vehicle door.

Further embodiments of the handle controller process the extension force signal while extending the door handle from the vehicle door. To facilitate the door handle extending from the vehicle door, the handle controller runs a motor operatively coupled to a door handle. As the door handle extends, the swing arm coupled to the door handle also extends from the vehicle door and presses against the extension force sensor—this creates a first extension force signal response. The handle controller may stop the motor if the first extension force signal indicates that the handle is fully extended. In some embodiments, the handle controller determines that the handle is fully extended when the first extension force signal is greater than an extension stop threshold. Subsequently, the handle controller may receive and process a second extension force signal response as a result of a hand pulling on the door handle and the swing arm coupled to the door handle pressing against the extension force sensor a second time. In response to the second extension force signal, the handle controller may in turn request unlatching a latch holding the vehicle door shut, and allowing the vehicle door to open.

DETAILED DESCRIPTION

In the following detailed description, for purposes of explanation, numerous specific details are set forth to provide a thorough understanding of the various embodiments of the disclosure. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming but would nevertheless be a routine engineering undertaking for those of ordinary skill in the art having the benefit of this disclosure.

Figure 1A:
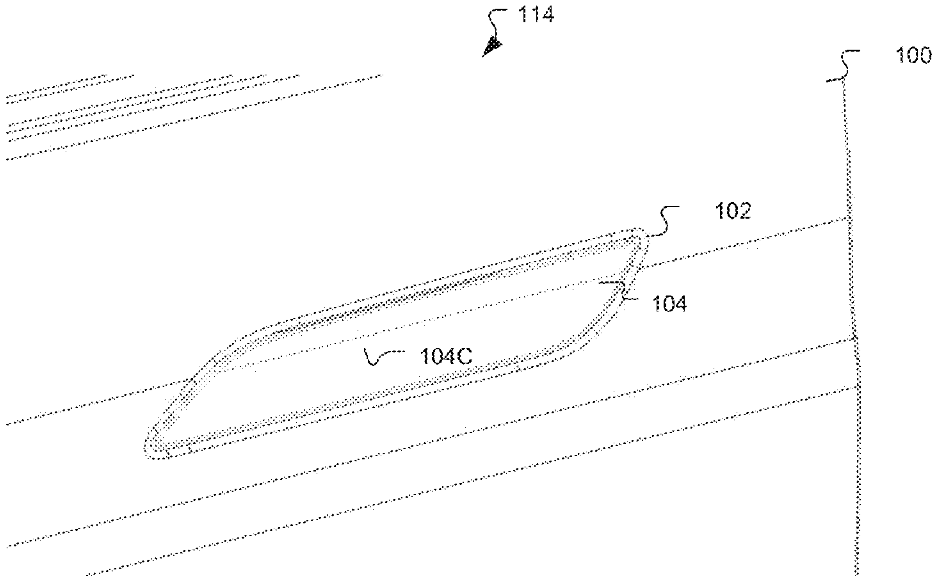
FIGS. 1A-1B provides an exterior view of a vehicle door portion with a door handle in both a retracted position and extended position in accordance with some embodiments.
Figure 1B:
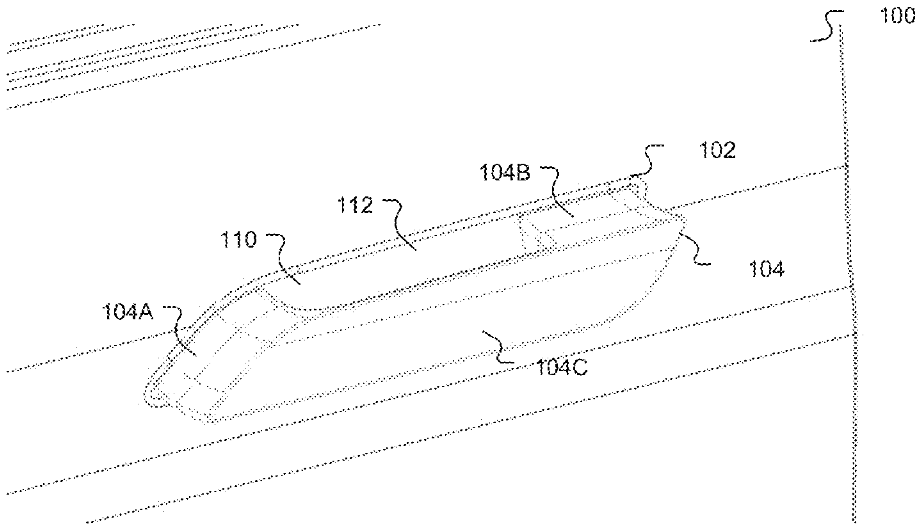
Figure 2:
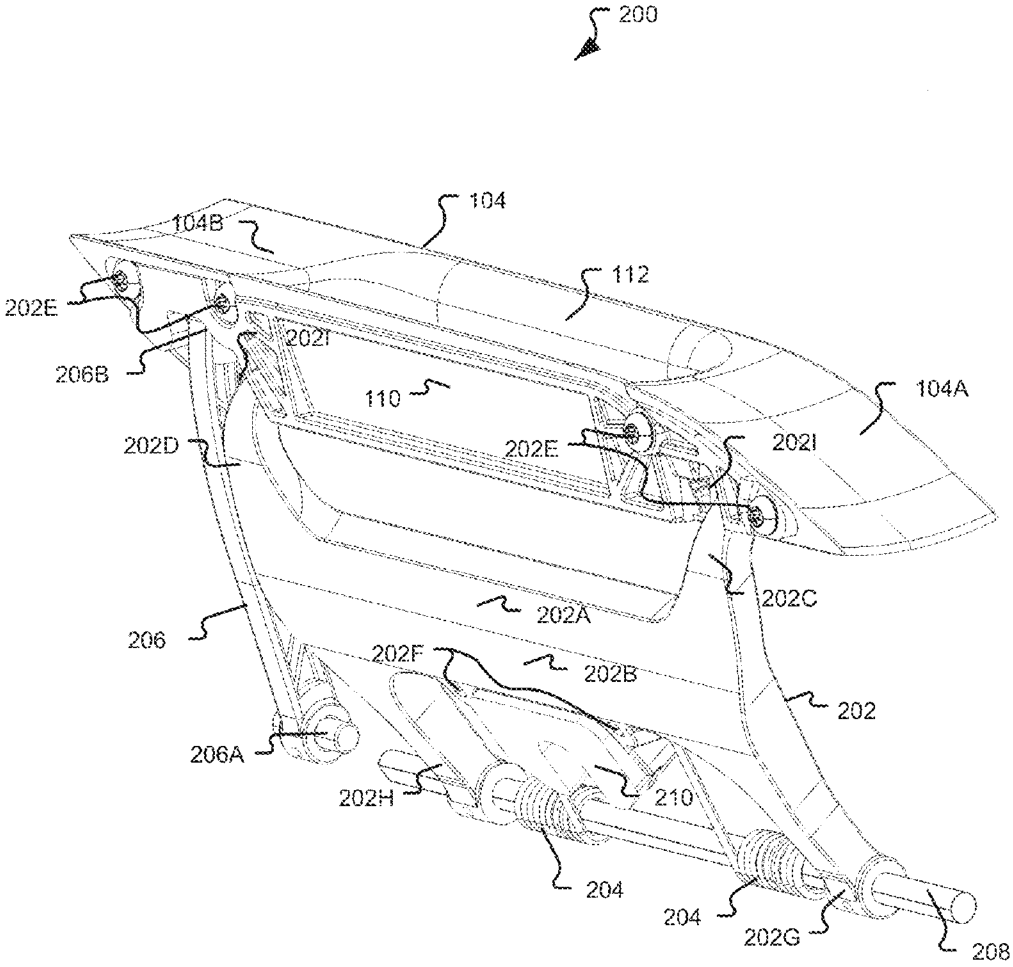
FIG. 2 provides a perspective view of a door handle assembly from an interior perspective in accordance with some embodiments.
Figure 3A:
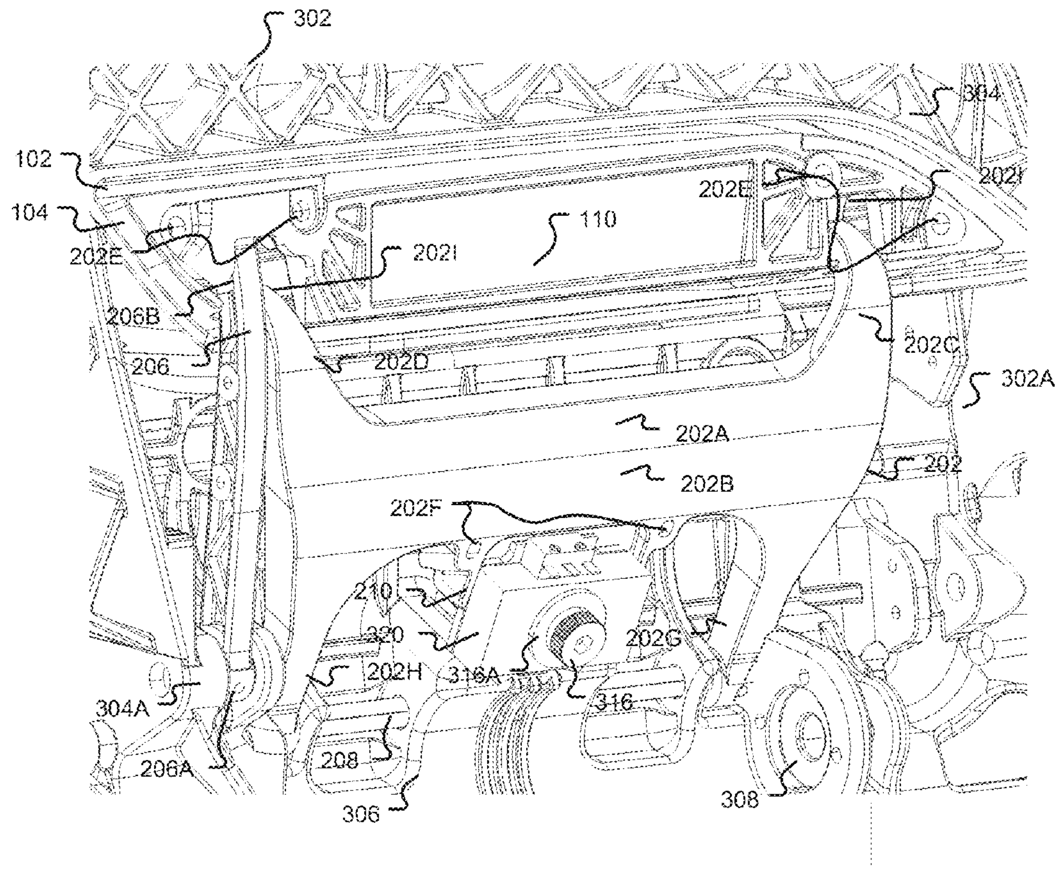
FIGS. 3A-3B provide perspective views of a door handle assembly installed in a door handle tray and attached to an inner door surface of a door in accordance with some embodiments.
Figure 3B:
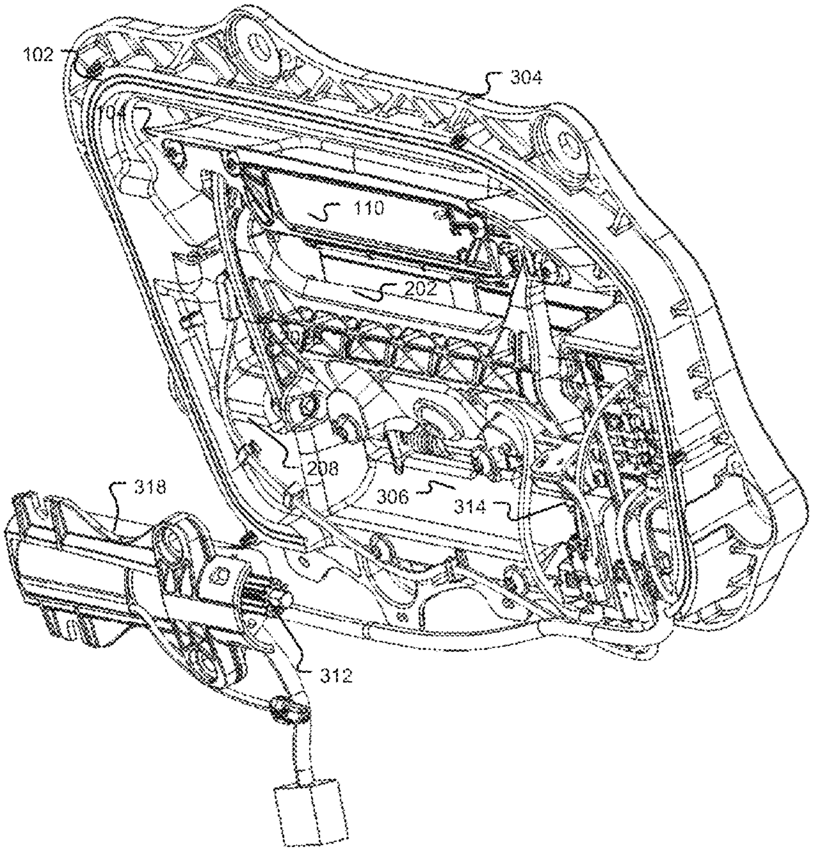
Figure 4:
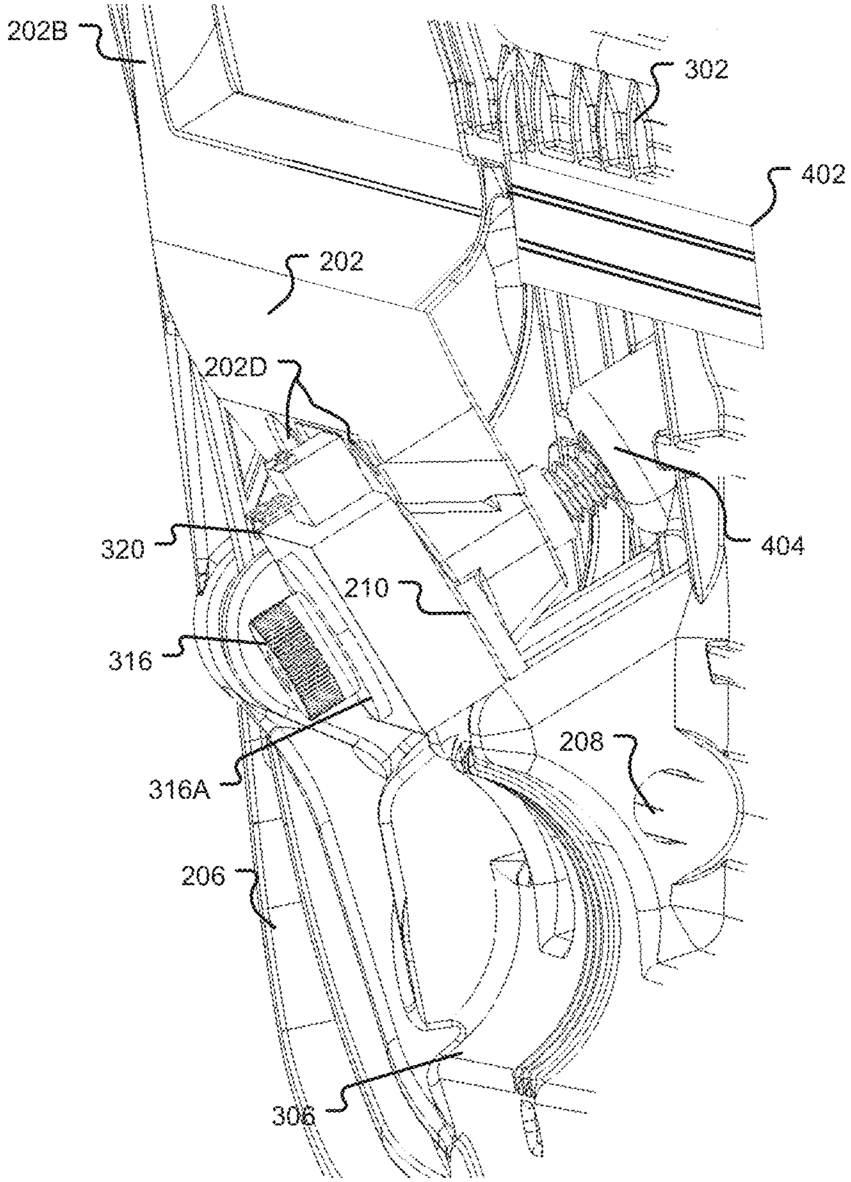
FIG. 4 provides a cross-sectional side view of a door handle assembly exposing a retraction sensor and an extension sensor in accordance with some embodiments.

Referring to FIG. 1A-1B, a door handle in both a retracted and extended position in accordance with some embodiments is provided along with an exterior view of a vehicle door portion. The vehicle door portion 114, as illustrated, has an outer door surface 100 and a handle aperture 102 that door handle 104 passes through. In some embodiments, the handle aperture 102 in the vehicle door may be formed using a sleeve fitted through the vehicle door. Alternate embodiments may instead incorporate handle aperture 102 directly into the material used to manufacture the vehicle door.

In the retracted position depicted in FIG. 1A, a planar handle member 104C of the door handle 104 is flush with the outer door surface 100 and has an outside shape that fits handle aperture 102. Keeping door handle 104 in the retracted position provides both a smooth appearance and advantageous aerodynamic qualities when the vehicle is in motion. When the vehicle is stopped or operating at a relatively slow speed, door handle 104 may be extended, or deployed, with planar handle member 104C moving in a parallel manner from outer door surface 100 to a predetermined height, typically corresponding to the height of first post portion 104B or second post portion 104A of planar handle member 104C.

To further enhance the overall comfort, safety, and appearance, some embodiments of door handle 104 are formed by coupling a handle base member 110 to planar handle member 104C at the distal portions of first post portion 104B and second post portion 104A. In the deployed state, planar surface of handle base member 110 extending between first post portion 104B and second post portion 104A may also be substantially flush with surrounding areas of outer door surface 100. The resulting smooth contiguous surface presented as a hand is inserted in the wrapped handle grip 112 engenders quality and integrity, both visually and practically, in the operation of door handle 104 and the vehicle to which it is attached.

To give the door handle 104 the appearance of gradually floating into position, several different subcomponents or assemblies are used under the direction of a combination of one or more controllers as depicted and described in FIGS. 2, 3A, 3B, 4, 5A, 5B, 6, 7A, 7B, 7C, and 8-10. The subcomponents in some embodiments include a door assembly 200, a handle assembly tray 304, and an inner door assembly aperture 302A portion of the inner door surface 302. For example, door assembly 200 may be installed inside handle assembly tray 304 before the handle assemble tray 304 is then mounted in an opening in the inner door, the inner door assembly aperture 302A. The modular design of handle assembly tray 304 facilitates cost-effective manufacture and allows selective use of stiffening materials in handle assembly tray 304, rather than the entire inner door surface 302, to enhance the overall precision and alignment of door assembly 200 when it is installed. Once mounted, the handle assembly tray 304 holding the door assembly 200 becomes integral to the inner door surface 302 and the vehicle door as a whole. Accordingly, in alternate embodiments portions of inner door surface 302 may be designed to directly receive door assembly 200, this would obviate using handle assembly tray 304 to install door assembly 200 as a module separate from the vehicle door.

By securely attaching handle base member 110 to door handle 104 with handle fasteners 202E, both the door handle 104 and handle base member 110 move together when urged by a swing arm 202. Swing arm 202 in one embodiment has both an upper dual fork portion 202A and a lower dual fork portion 202B, and may be referred to as a "swan neck fork" arm due to the widely spaced arcuate forks. In this embodiment, the shape of each arcuate fork and the width between forks provide a stiffness that reduces torsional displacement and linear deflection when the door handle 104 is used. As the term "arcuate" refers to all or portions of a circular line, it is contemplated that the arcuate shapes of dual forks in upper dual fork portion 202A and lower dual fork portion 202B, as well as the width between each fork, may be modified depending on the particular shape of the door and other implementation details.

From upper dual fork portion 202A, a first upper fork 202C is rotably coupled to a backside of handle base member 110 near the distal portion of the second post portion 104A. Likewise, a second upper fork 202D from the upper dual fork portion 202A is also rotably coupled to the backside of the handle base member 110 near the distal portion of the first post portion 104B. In some implementations, both second upper fork 202D and first upper fork 202C fit into slotted openings 2021 within handle base member 110. A smaller shaft passes through axial openings in the walls of each slotted opening 2021 and the ends of each upper dual fork portion 202A, this enables the door handle 104 and handle base member 110 to pivot about the upper portion of swing arm 202.

In some embodiments, lower dual fork portion 202B pivots about a shaft 208 slidably inserted through corresponding axial openings in handle assembly tray 304. If an assembly tray 304 is not utilized to mount door handle assembly 200, shaft 208 may alternatively be axially attached through openings made directly in the inner door surface 302. In either embodiment, once the lower dual fork portion 202B is rotably attached to shaft 208, pivoting of the swing arm 202 also results in movement of the door handle 104 and handle base member 110. In particular, as the swing arm 202 pivots around shaft 208, the upper dual fork portion 202A of the swing arm 202 moves portions of door handle 104 between outer door surface 100 and inner door surface 302. For example, moving the swing arm 202 towards the inner door surface 302 causes door handle 104 to extend through handle aperture 102, this positions the door handle 104 above the outer door surface 100. Conversely, moving the swing arm 202 away from the inner door surface 302 urges the door handle 104 to retract through the handle aperture 102, this eventually results in retracting the planar handle member 104C until it is flush with the outer door surface 100.

As the door handle 104 extends and retracts through handle aperture 102, control arm 206 keeps its motion along a parallel direction. The precision and predictability of this parallel motion compliments the overall design and further engenders an impression of reliability, integrity, and craftsmanship of the vehicle handle 104 and the vehicle in which it used. The parallel motion of the door handle 104 also helps accommodate a tight packaging requirement within the door while providing a wrapped handle grip 112 with adequate clearance for fingers and a hand. Within the interior of the car door, for example, the swing arm 202 can retract door handle 104 without damaging a retracted window of the car door. In some embodiments, an upper control arm pivot 206B rotably connected to the backside of the handle base member 110 is positioned off-axis to the rotably coupled second upper fork 202D. Similarly, a corresponding lower control arm pivot 206A is rotably connected to the inner door surface 302 of the vehicle door and positioned off-axis to the rotably coupled second lower fork 202H. Combined together, the off-axis positioning of control arm 206 relative to swing arm 202 creates a four-bar link for controlling motion of door handle 104. In one embodiment, the control arm 206 controls the longitudinal rotation of the vehicle handle 104 and constrains the vehicle handle 104 movement along a parallel direction from outer door surface 100.

A biasing member 204, implemented in some embodiments with springs, operates to urge door handle 104 into a retracted position flush with the outer door surface 100. Coiled portions of the springs from biasing member 204 are wrapped around shaft 208 while tails of the springs are inserted into spring insertion points 202F. While the force imparted by biasing member 204 urges the swing arm 202 to retract, it is not strong enough to pinch or hurt a hand inserted into wrapped handle grip 112 of door handle 104. Consequently, if a hand is inside wrapped handle grip 112, biasing member 204 may partially retract the door handle 104 towards the inner door surface 302 stopping when the person's hand meets the handle aperture 102.

To extend the vehicle handle 104, one embodiment of door handle assembly 200 utilizes a handle motor 318 and various drive components, A motor mount 306 in the door handle assembly 200 receives the handle motor 318 with a drive shaft passing through motor shaft opening 308. Drive gear 312 is axially mounted on the drive shaft and, when positioned in drive gear slot 310, engages with and meshes to gears from a paddle gear 314. By mounting paddle gear 314 about shaft 208 and rotating handle motor 318 in a first direction, the gears are advanced and the opposing face of the paddle, at the distal end, slidably engages first lower fork 202G. The force imparted upon first lower fork 202G overcomes the opposing force from biasing member 204 thus urging swing arm 202 towards the inner door surface 302 and moving door handle 104 into an extended position.

In some embodiments; the handle motor 318 stops rotating in the first direction when the upper dual fork portion 202A applies pressure to extension sensor 402, this condition indicates the door handle 104 is fully extended. To keep the vehicle handle in this extended position, a handle controller 616 monitoring extension sensor 402 instructs the handle motor 318 to stop rotating in the first direction. Planetary gears incorporated in handle motor 318 resist retracting vehicle handle 104, even under the force imparted from biasing member 204.

The handle controller 616 may subsequently instruct handle motor 318 to rotate in the second direction, opposite the first rotational direction, thereby overcoming the torque of the planetary gears and allowing biasing member 204 to retract vehicle handle 104. The chance of pinching fingers or hands in wrapped handle grip 112 is reduced as the flat side of paddle gear 314 drops away from first lower fork 202G and only the force of biasing member 204 retracts vehicle handle 104. The handle controller 616 instructs the handle motor 318 to stop rotating in the second direction when the lower dual fork portion 202B applies sufficient pressure on retraction sensor 320, this condition indicates the door handle 104 is fully retracted. In various embodiments, extension sensor 402 and retraction sensor 320 may be implemented using a variety of mechanical, electromechanical, solid-state, magnetic, nano-particle, piezo-electric based technologies capable of detecting a force, a change in force, a distance traveled, a change in electrical resistance, deformation or other events producing results that may be detected and processed by handle controller 616.

Retraction sensor 320 is fixedly mounted on a sensor flange 210 located between the first lower fork 202G and second lower fork 202H of lower dual fork portion 202B. In some embodiments, placing sensor flange 210 and retraction sensor 320 equidistant from the first lower fork 202G and second lower fork 202H helps maintain even pressure on retraction sensor 320. A flush adjuster rod 316 placed through a longitudinal slot or aperture in retraction sensor 320 limits how far swing arm 202 may retract. The flush adjuster rod 316 passes through both retraction sensor 320 and sensor flange 210 into a threaded opening 404 of the inner door surface 302. The size of annular flange 316A is sufficiently large to evenly distribute force from swing arm 202 over the face of retraction sensor 320. Some embodiments may integrate the annular flange 316A into the top of flush adjuster rod 316 or by axially sliding a washer or gasket into place over the flush adjuster rod 316. To fit door assembly 200 into a vehicle door during manufacture, the flush adjuster rod 316 is axially adjusted against the force of biasing member 204 until the surface of planar handle member 104C is flush with the outer door surface 100.

Figure 6:
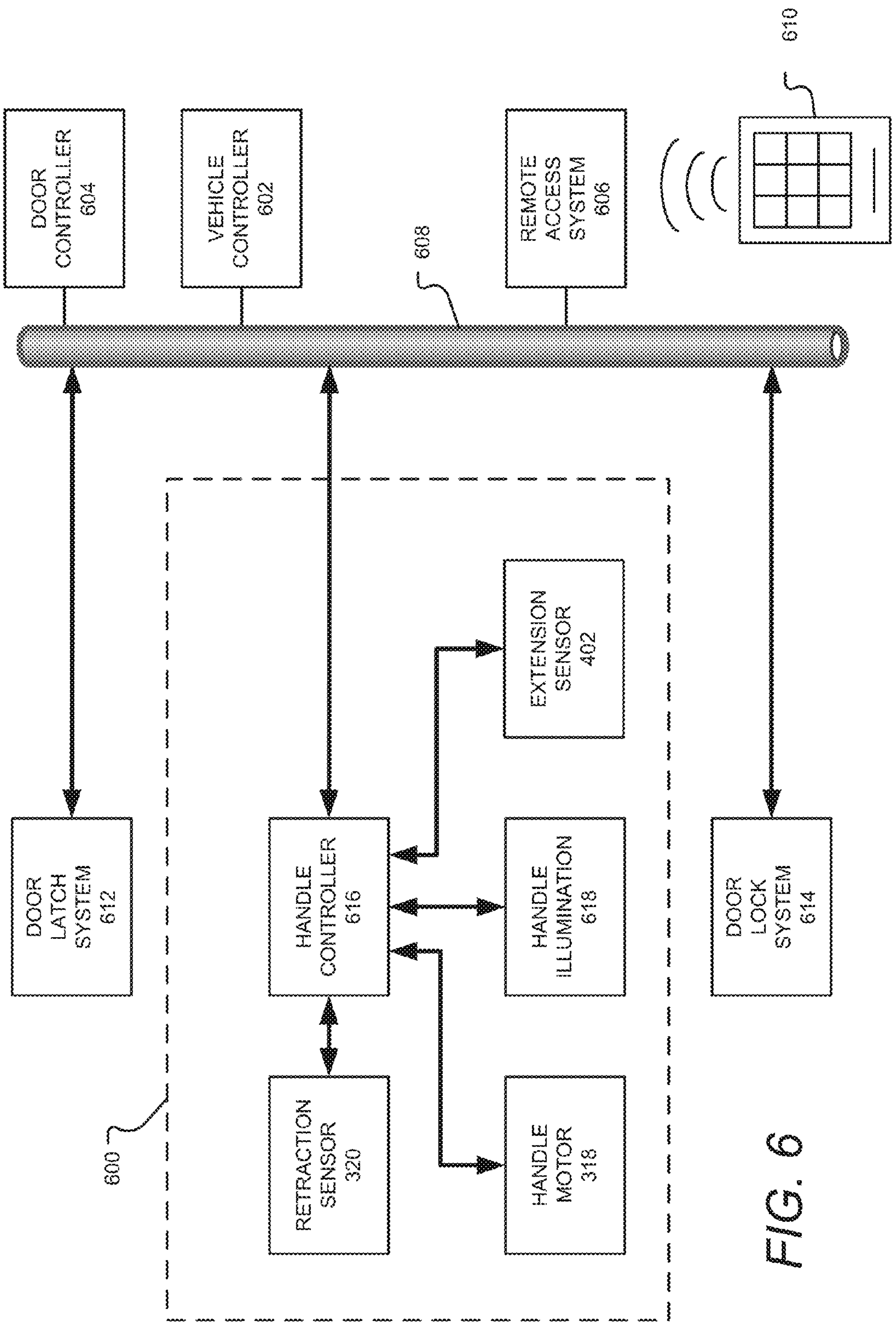
FIG. 6 schematically illustrates systems and electronics supporting operation of a door handle assembly in accordance with some embodiments.

FIG. 6 schematically illustrates systems and electronics supporting operation of a door handle assembly 200 in accordance with some embodiments. As illustrated, these systems may include door handle system 600, a vehicle controller 602, a door controller 604, a remote access system 606, a wireless controller 610, a door latch system 612, and a door lock system 614. In one embodiment, door handle system 600 operates door handle 104 while door controller unit 604 actuates door latch system 612 and/or door lock system 614.

The door handle system 600 in one embodiment includes retraction sensor 320, handle motor 318, extension sensor 402, handle controller 616, and handle illumination 618. Typically, handle controller 616 receives sensor data from retraction sensor 320 or extension sensor 402 then uses the results to determine whether to extend or retract the door handle 104. Handle controller 402 may also use vehicle status information from door controller 604 and vehicle controller 602 in determining when to extend or retract door handle 102. For example, if vehicle controller 602 indicates a vehicle is moving, then door handle system 600 may not extend door handle 104. In general, handle controller 616, door controller 604, and vehicle controller 602 may include one or more embedded or general purpose processors running a variety of software or firmware configured to control door handle 104 and operation of other various portions of the vehicle.

Figure 5A:
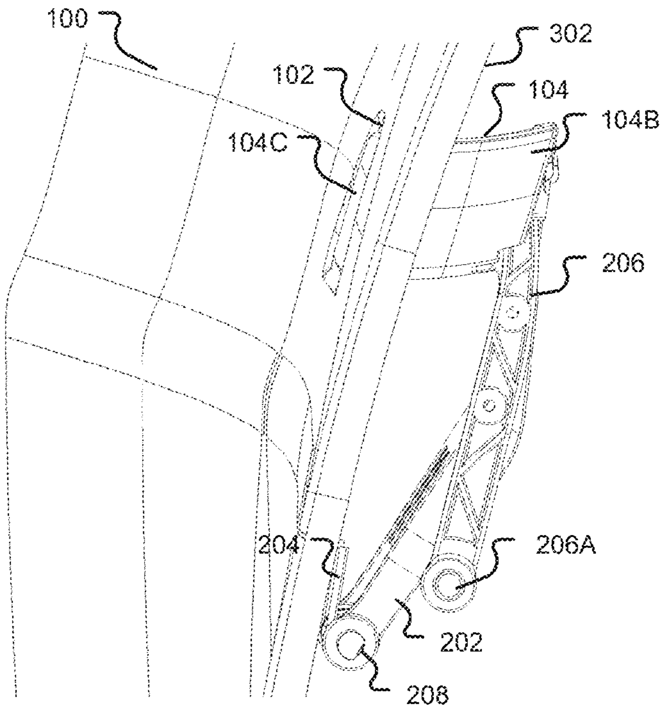
FIG. 5A-B provides a perspective side view of a vehicle door and portions of a door handle assembly with a door handle in both a retracted and an extended position in accordance with some embodiments.

When door handle 104 is retracted as illustrated in FIG. 5A, a user's hand may push inward on planar handle member 104C causing retraction sensor 320 to send a signal requesting to extend vehicle handle 104. Before fulfilling the request to extend, handle controller 616 may communicate with vehicle controller 602 to check vehicle status and get authorization to extend door handle 104. For example, vehicle controller unit 602 may authorize extending door handle 104 if the vehicle is not moving and the person pushing on the door handle 104 possesses a proper wireless controller 610 such as a key fob. In some embodiments, vehicle controller 602 may further check with remote access system 606 to make certain this latter condition is met before authorizing handle controller 616 to operate handle rotor 318 and extend door handle 104 as previously described.

Figure 5B:
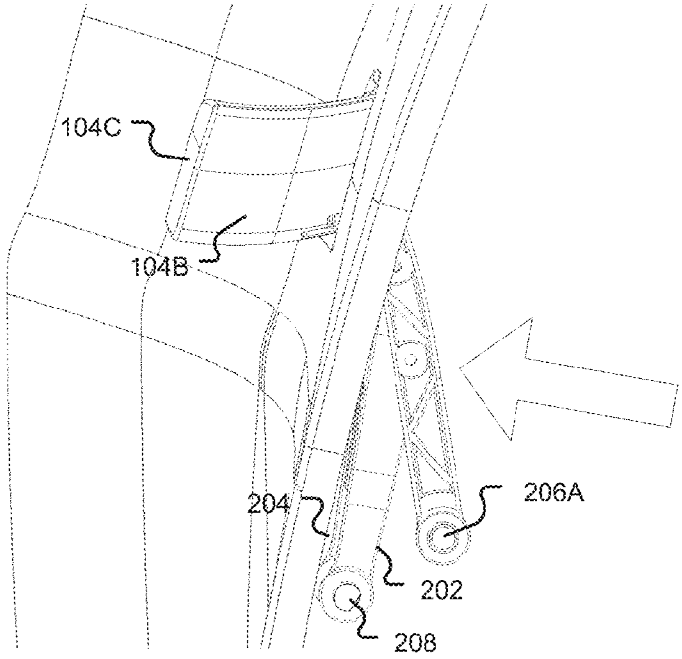

In the event door handle 104 is extended as depicted in FIG. 5B, a user's hand may pull on wrapped handle grip 112 causing extension sensor 402 to send a signal corresponding to a request to unlatch the vehicle door. Instead of fulfilling this request immediately, one embodiment of handle controller 616 forwards the request to unlatch the vehicle door to vehicle controller unit 602. Vehicle controller unit 602, in turn, may authorize door controller 604 to unlatch the vehicle door if the vehicle is not moving and the person pulling on the door handle 104 possesses the proper wireless controller 610 or key fob as determined by remote access system 606.

Figure 7A:
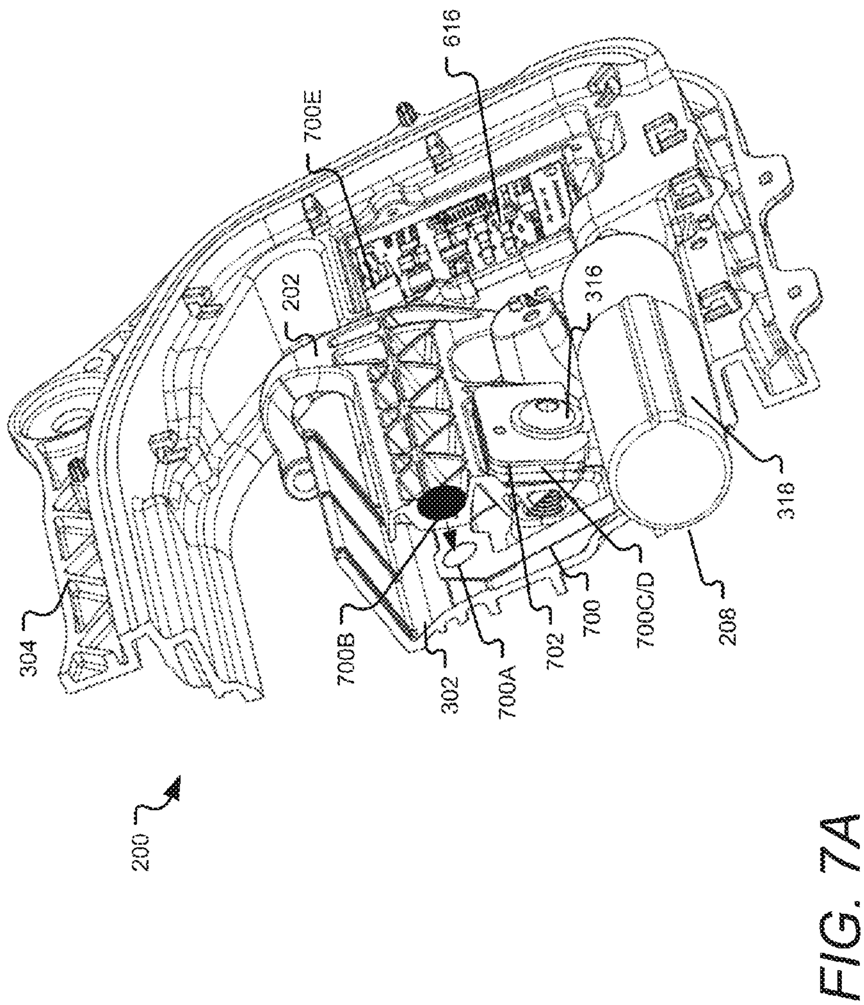
FIG. 7A-C illustrates multiple perspective views of a door handle assembly and sensors in accordance with some embodiments.
Figure 7C:
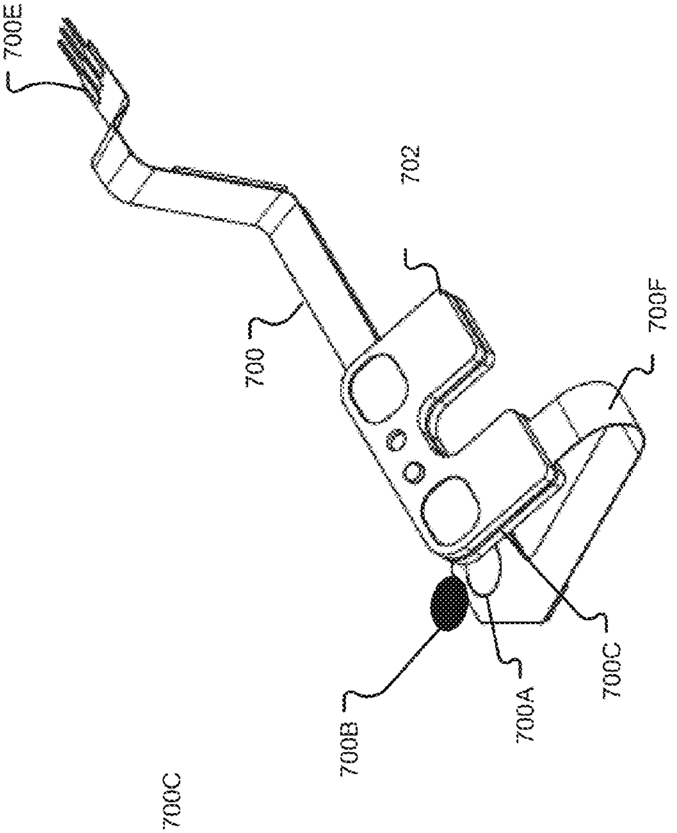
Figure 7B:
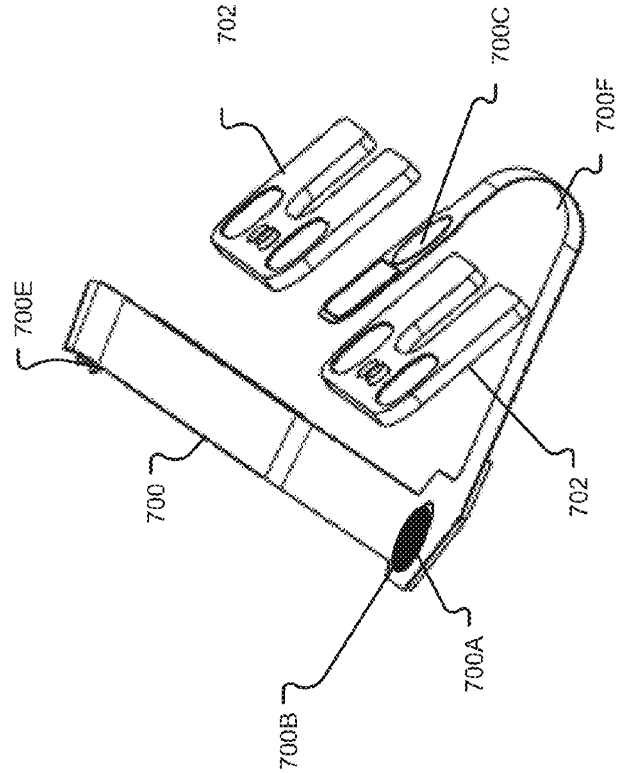

Referring to FIGS. 7A-C, several illustrations provide different perspective views of a door handle assembly and sensors in accordance with some embodiments. In some embodiments, both an extension force sensor 700A and a retraction force sensor 700C are incorporated in a single integrated force sensor 700 and constructed using flexible circuit technologies and materials such as Mylar®, Kapton®, or other Polymide based materials. Each of extension force sensor 700A and retraction force sensor 700C have at least one conductor, and possibly several conductors, for carrying signals between each sensor and handle controller 616. Upon receiving and processing these signals, handle controller 616 executes instructions that control the operation of door handle 104 in door handle assembly 200. It can be appreciated that extension force sensor 700A corresponds to extension sensor 402 illustrated in FIG. 4 and is one type of extension sensor that receives a force and responds by producing force response signal according to the force received. Likewise, retraction force sensor 700C corresponds to retraction sensor 320 and is one type of retraction sensor that receives a force and produces a force response signal in return.

In part, integrated force sensor 700 is advantageous as it may be connected to handle controller 616 using a single force sensor connector 700E. This reduces costs by avoiding multiple connections, duplicative wiring, and added space required for multiple connectors on handle controller 616 and within the handle assembly 200. As another advantage, the flexible interconnection 700F formed between the max force sensor 700A and min force sensor 700C bends smoothly as swing arm 202 extends and retracts. Strain on integrated force sensor 700 is reduced as the swing arm 202 moves along the length of the flexible circuitry. In alternate embodiments not using integrated force sensor 700, extension force sensor 700A and retraction force sensor 700C may instead be discrete sensors with individual flexible circuitry interconnections (not shown) to handle controller 616 rather than the single force sensor connector 700E. Accordingly, the aforementioned advantages are meant to be illustrative, not limiting, and other alternate embodiments may include greater or fewer of the aforementioned advantages or may included additional advantages implied but not mentioned expressly herein.

In some embodiments, the portion of integrated force sensor 700 incorporating extension force sensor 700A is fixedly attached to the inner door surface 302 within handle assembly tray 304. For example, an adhesive material resilient to heat, cold, moisture, and other conditions may be used to attach a segment of the integrated force sensor 700 to the inner door surface 302. The distal end of integrated force sensor 700 passes under swing arm 202 and plugs into handle controller 700 through single force sensor connector 700E.

To enhance operation of extension force sensor 700A, an extension sensor puck 700B may be fixedly attached to a surface of the extension force sensor 700A. The extension sensor puck 700B provides a uniform area for an upper portion of the swing arm 202 to contact with the underlying extension force sensor 700A. Covering extension force sensor 700A in this manner also improves reliability by reducing direct contact with, and associated wear of, the sensor.

Retraction force sensor 700C is located at the proximal end of integrated force sensor 700 and sandwiched between plate clamps 702. While plate clamps 702 align retraction force sensor 700B, fasteners hold plate clamps 702 in a fixed position against sensor flange 210. In some embodiments, a retraction sensor puck (not illustrated) may be situated between retraction force sensor 700C and one or both of plate clamps 702. As previously described, the puck provides a uniform area for receiving pressure and improves predictability, reliability, and serviceability of the sensor. For example, each time swing arm 202 is retracted, the flush adjuster rod 316 transfers the resulting force through retraction sensor puck to retraction force sensor 700C. If retraction sensor puck becomes worn and handle assembly 304 needs service, the retraction sensor puck and/or the extension sensor puck 700B may be replaced rather than replacing the entire integrated force sensor 700.

In operation, extension force sensor 700A generates an extension force response signal when swing arm 202 pivots about shaft 208 and is extended. The extension force response signal corresponds to a force created between the extension force sensor 700A and the upper portion of the swing arm 202. As illustrated in FIG. 5B, extending the swing arm 202 also causes the door handle 104 to move into an extended position from an outer door surface 100 of the vehicle door. Subsequently, when a person's hand pulls on the extended door handle 104, extension force sensor 700A may also generate another extension force response signal. In both instances, the extension force response signal corresponds to the force between extension force sensor 700A coming into contact with the swing arm 202. As described in further detail later herein, handle controller 616 receives and processes these extension force response signals and determines whether the door handle 104 is moving into the extended position or the user is pulling on the door handle 104.

Similarly, retraction force sensor 700C generates a retraction force response signal when swing arm 202 pivots about shaft 208 and is retracted. As illustrated in FIG. 5A, retracting the swing arm 202 also moves the door handle 104 into a retracted position. Moving from the extended position into the retracted position, the planar handle member 104C passes through a handle aperture 102 of the vehicle door until it is flush to the outer door surface 100 of the vehicle door. The resulting retraction force response signal corresponds to a force between the retraction force sensor 700B on the lower portion of the swing arm 202 as it comes into contact with the flush adjuster rod 316. In some embodiments, the retraction force sensor 700C is fixedly attached to the sensor flange 210 on the lower portion of the swing arm.

Once the door handle 104 is retracted, retraction force sensor 700C may also generate another retraction force response signal when a user pushes in on the door handle 104. Typically, the retraction force response signal from the user pushing on the door handle 104 is greater than the force generated when the door handle 104 is retracted. In both instances, the retraction force sensor 700C generates the retraction force response signal as a result of the contact with the flush adjuster rod 316. As described in further detail later herein, the handle controller 616 receives and processes the retraction force response signals and determines whether the door handle 104 is moving into the retracted position or the user is pushing in on the door handle 104.

Figure 8:
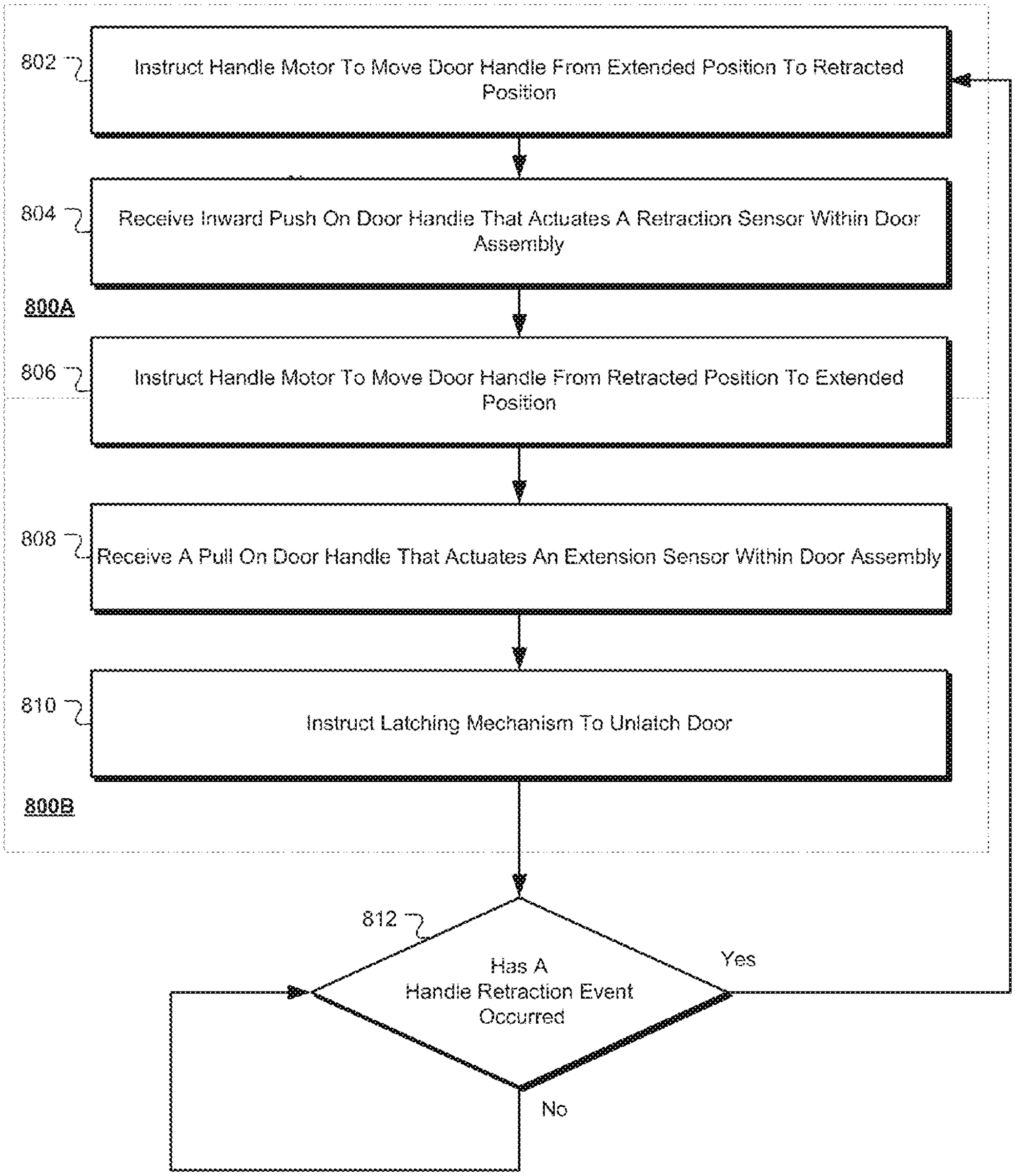
FIG. 8 provides a flowchart diagram overview of the operations associated with handle controller controlling a door handle in accordance with some embodiments.

FIG. 8 provides a flowchart diagram overview of the operations associated with handle controller 616 controlling a door handle 104 in accordance with some embodiments. In particular, handle operations 800A in FIG. 8 concern controlling the door handle 104 as it moves from a retracted position to an extended position. To retract the door handle, the handle motor is instructed to move the door handle from an extended position to retracted position (802). As previously described, handle controller 616 instructs the handle motor 318 to rotate and overcome the resistance and/or of the planetary gears keeping the door handle 104 in the extended position. As the handle motor 318 rotates, the flat side of paddle gear 314 drops away from first lower fork 202G and the force of biasing member 204 retracts door handle 104. Once the door handle 104 is retracted, a user's hand makes an inward push on the door handle 104 that, in turn, actuates a retraction sensor 320 within the door assembly (804). In response to the retraction sensor 320, the handle motor 318 is instructed to move the door handle 104 from a retracted position to the extended position in preparation to unlatch the vehicle door (802-812).

Handle operations 800B in FIG. 8 concern controlling the door handle 104 as it moves into the extended position and unlatches the vehicle door. During handle operations 800B, the door handle 104 enters into a fully extended position from the surface of the vehicle door (806). In the fully extended position, the user's hand may pull on the door handle 104 and actuate an extension sensor 402 within the door assembly (808). In response to actuating the extension sensor 402, some embodiments forward a request to door controller 604 to unlatch the door. The door handle 104 may continue to stay extended (812) until a handle retraction event occurs (812) and the overall control of the door handle 104 repeats (802). For example, the door handle 104 may retract if the car starts moving faster than a predetermined speed, or when the door handle 104 has been in an extended position for a predetermined period of time and has not been used.

Figure 9:
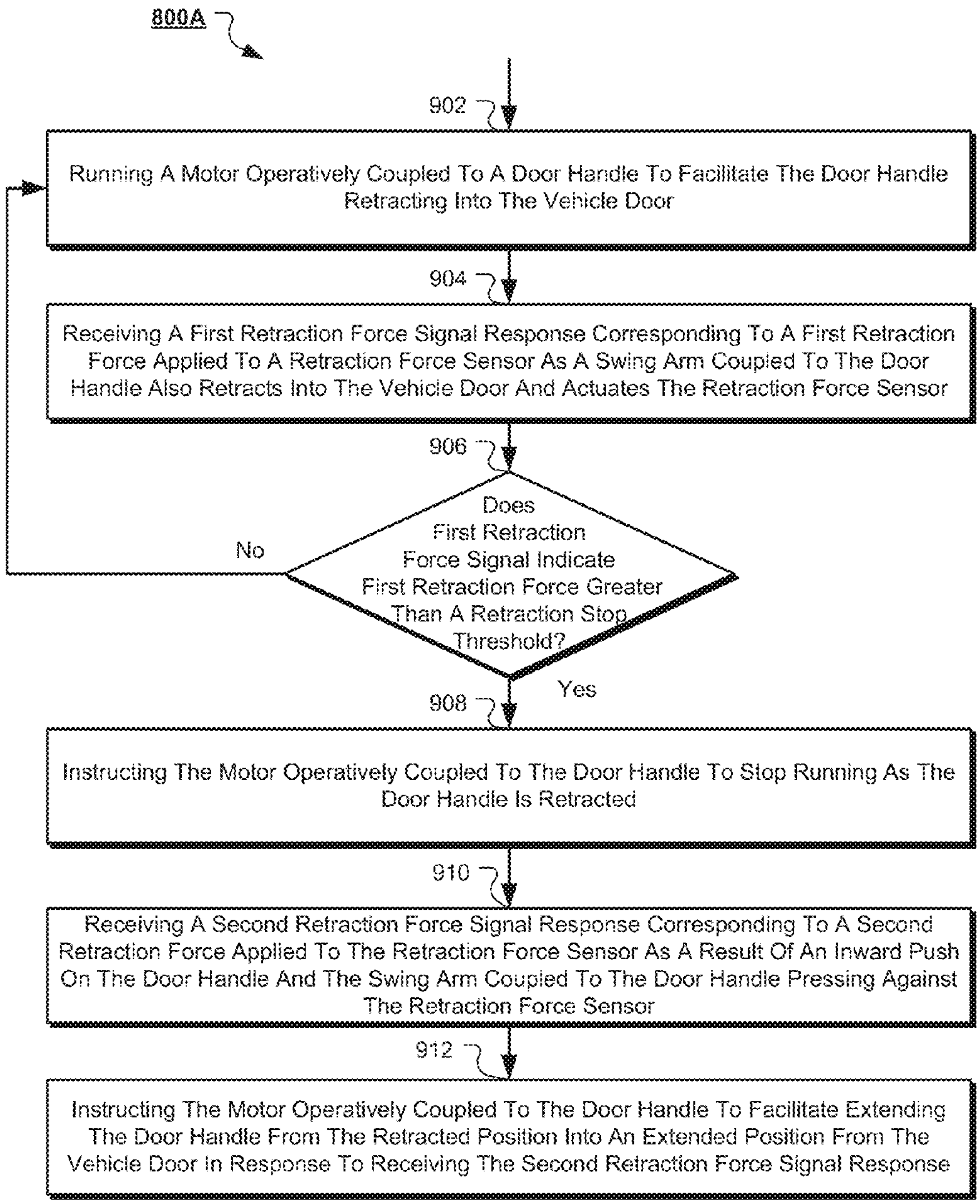
FIGS. 9-10 detail the operations associated with using an extension force sensor and retraction force sensor to control a door handle in accordance with some embodiments.
Figure 10:
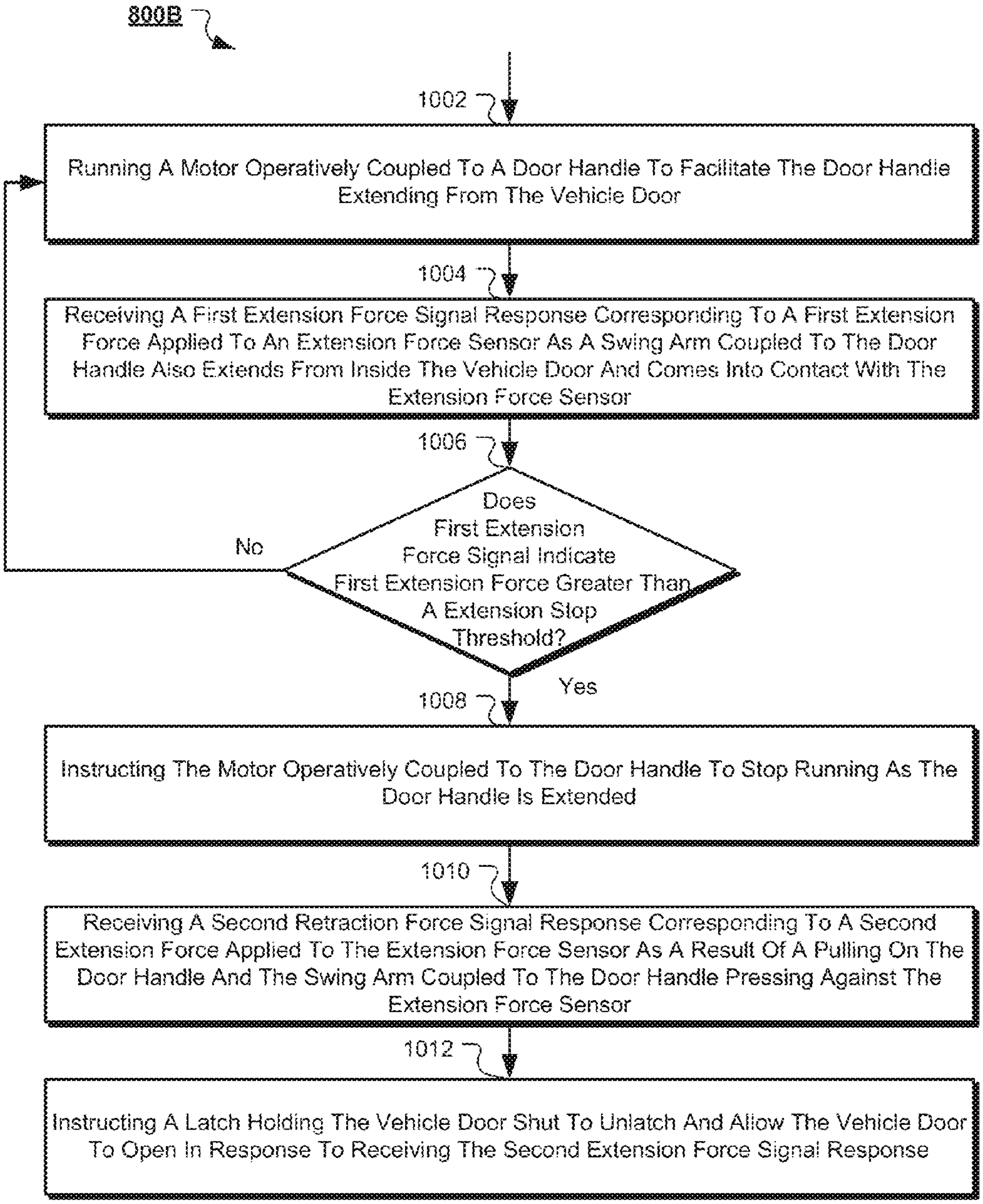

FIGS. 9-10 detail the operations associated with using an extension force sensor 700A and retraction force sensor 700C to control a door handle 104 in accordance with some embodiments. In particular, the operations from the flowchart in FIG. 9 correspond to using retraction force sensor 700C when moving the door handle 104 from a retracted position and into an extended position from a vehicle door. Initially, some embodiments run a handle motor 318 operatively coupled to a door handle 104 to facilitate the door handle 104 retracting into the vehicle door (902). As described previously, handle motor 318 is operated to allow the flat side of paddle gear 314 to drop away from first lower fork 202G with only the force of biasing member 204 urging the swing arm 202 and door handle 104 to retract.

As the door handle 104 retracts into the vehicle door, some embodiments receive a first retraction force signal response from the retraction force sensor 700C (904). Swing arm 202 coupled to door handle 104 retracts into the vehicle door and presses against the retraction force sensor 700C. In some embodiments, the pressure or force detected occurs when the retraction force sensor 700C in plate clamps 702 comes in contact with flush adjuster rod 316.

If the first retraction force signal indicates the first retraction force is not greater than a retraction stop threshold, (906—No) the handle motor 318 continues to run allowing the door handle 104 to further retract into the vehicle door (902). Eventually, when the retraction force is greater than the retraction stop threshold (906—Yes), the motor is instructed to stop running as the door handle 104 has been sufficiently retracted (908). In some embodiments, the door handle 104 may be calibrated such that the planar surface of the door handle 104 is flush with the surface of the vehicle door when the first retraction force is greater than the retraction stop threshold.

With the door handle retracted, some embodiments receive a second retraction force signal response corresponding to a second retraction force applied to the retraction force sensor 700C (910). In most cases, the second retraction force occurs as a result of a hand pushing inward on the door handle 104, and the swing arm 202 pressing against the retraction force sensor 700C a second time. To confirm a hand has pushed on the door handle, some embodiments check if the second retraction force on the door handle 104 was greater than the first retraction force on the door handle 104. Other embodiments may also determine if the second retraction force is greater than the first retraction force by a minimum push threshold force. In addition, some embodiments may measure if the time period for the second retraction force has a minimum push pulse width to determine whether the second retraction force was from a person's hand. If it is determined that the second retraction force signal was from a hand pushing inward on the door handle, a controller 616 instructs the motor 318 to extend the door handle 104 from the retracted position into an extended position (912).

A flowchart diagram in FIG. 10 provides operations for using extension force sensor 700A to control unlatching the vehicle door with door handle 104. In some embodiments, controller 616 runs handle motor 318 to facilitate the door handle 104 extending from the vehicle door (1002). As described previously, by mounting paddle gear 314 about shaft 208 and rotating handle motor 318, the gears on paddle gear 314 are advanced and the door handle 104 is extended. As the door handle 104 extends, some embodiments receive a first extension force signal response corresponding to a first extension force applied to an extension force sensor 700A (1004). In one embodiment, the first extension force signal response is received when swing arm 202, coupled to the door handle 104, also extends from inside the vehicle door and comes into contact with the extension force sensor 700A. In this embodiment, the first extension force operates to overcome an opposite force imparted by biasing member 204 that urges the swing arm 202 and the door handle 104 to retract If the first extension force signal indicates the first extension force is not greater than a extension stop threshold, (1006—No) the motor 318 continues to run causing the door handle 104 to extend above the outer surface 100 of the vehicle door (1002). Eventually, when the extension force is greater than the extension stop threshold (1006—Yes), the motor 318 is instructed to stop running as the door handle 104 has been sufficiently extended (1008). In some embodiments, the minimum stop threshold corresponds to when the door handle 104 is fully extended from an outer surface 100 of the vehicle door.

With the door handle 104 extended, some embodiments receive a second extension force signal response corresponding to a second extension force applied to the extension force sensor 700A (1010). In most cases, the second extension force occurs as a result of a hand pulling on the door handle 104, and the swing arm 202 pressing against the extension force sensor 700A a second time. To confirm a hand has pulled the door handle, some embodiments check whether the second extension force was greater than the first extension force resulting from extending the door handle 104. Other embodiments may also compare the second retraction force with a minimum pull threshold force and the corresponding time period with a minimum pull pulse width to determine whether the second extension force is from a hand pulling on the door handle 104. Upon determining the door handle 104 was pulled, one embodiment instructs a latch holding the vehicle door shut to unlatch and allow the vehicle door to open (1012).

Figure 11:
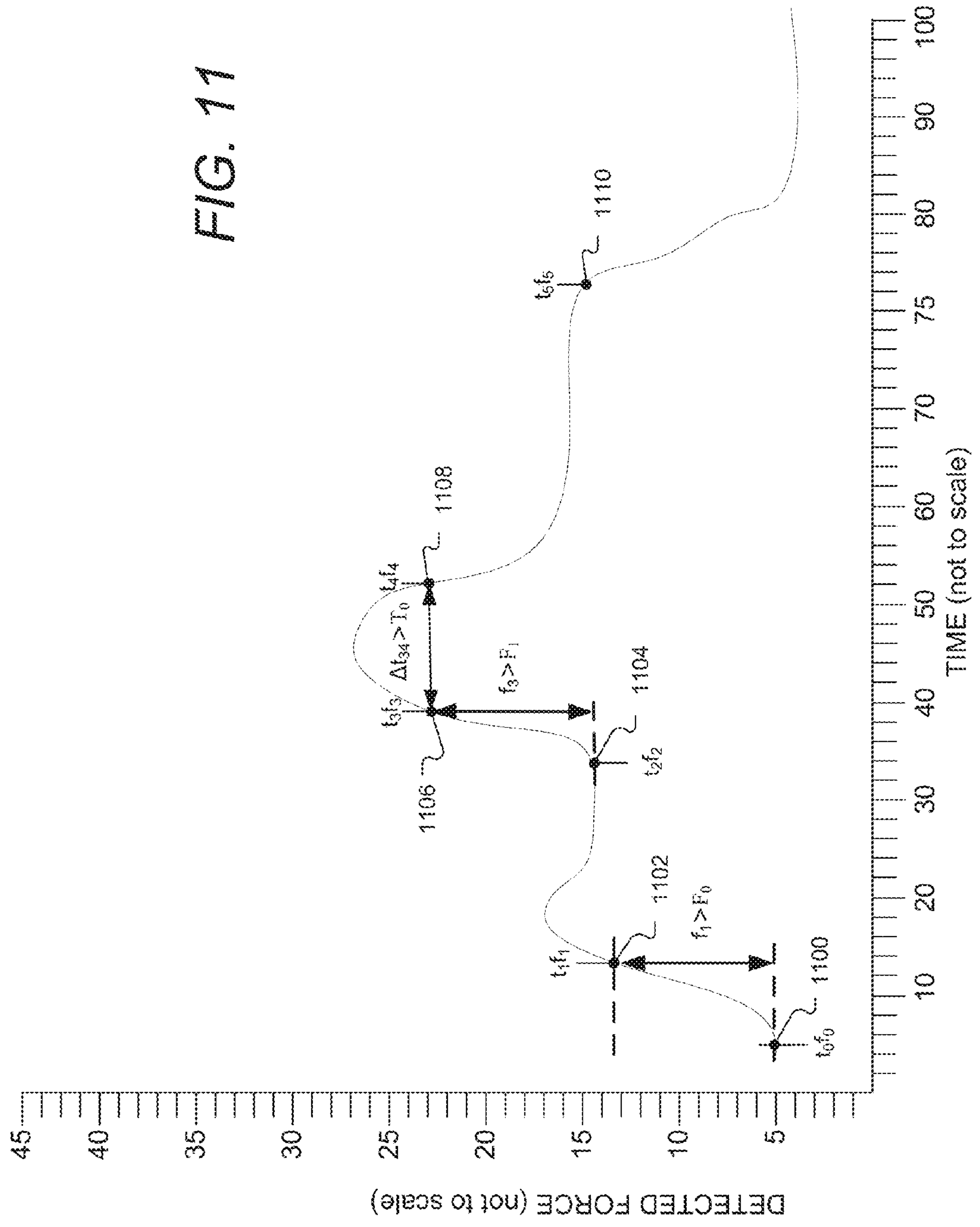
FIG. 11 is a schematic graph illustrating the use of force sensors in controlling a door handle in a door handle assembly.

FIG. 11 is a schematic graph illustrating the use of force sensors in controlling a door handle 104 in door handle assembly 200. As the signals from force sensors are processed similarly, the events highlighted in the schematic graph in FIG. 11 may be applied to both handle operations 800A/800B using extension force sensor 700A and retraction force sensor 700C respectively.

With respect to handle operations 800A, the schematic graph in FIG. 11 may be used to outline the events occurring when door handle 104 moves from a retracted position to an extended position. Specifically, the swing arm 202 retracts into the vehicle door at $t_0$ (1100) and begins applying a force $f_0$ to retraction force sensor 700C. Subsequently, the retraction force from swing arm 202 increases until at $t_1$ (1102) the increased force $f_1$ exceeds a retraction stop threshold $F_0$—(e.g., $f_1>F_0$). Upon reaching this threshold $F_0$, handle controller 616 instructs handle motor 318 to stop running and at time $t_2$ (1104) the door handle 104 is considered fully retracted.

Retraction force sensor 700C at time $t_3$ (1106) receives a second retraction force $f_3$ (1106) as a result of a hand pushing inward on the door handle 104 and swing arm 202. To confirm the force is from a hand and not a false input due to mechanical vibration (e.g., objects hitting door, door slamming), some embodiments check if the increased force $f_3$ (1106) on the door handle 104 was greater than a minimum push threshold $F_1$ (e.g., $f_3>F_1$) other embodiments may determine whether the second retraction force was from a person's hand by comparing the second retraction force $f_3$ with both a minimum push threshold $F_1$ (e.g., $f_3>F_1$) as well as a minimum push pulse width $T_0$ (e.g., $\Delta t_{34}>T_0$) (1108). Eventually, when the door handle 104 is almost fully extended at time $t_5$ (1110) it is no longer in contact with retraction force sensor 700C and the retraction force sensor response drops off.

Schematic graph in FIG. 11 may also be used to describe handle operations 800B when door handle 104 moves into an extended position and is then used to unlatch the door. In this case, swing arm 202 extends above the surface of the vehicle door at $t_0$ (1100) and begins applying a force $f_0$ to extension force sensor 700A. Subsequently, the extension force from swing arm 202 increases until at time $t_1$ (1102) the increased force $f_1$ exceeds a extension stop threshold $F_0$ (e.g., $f_1>F_0$). Handle controller 616 instructs handle motor 318 to stop running at time $t_1$, and at time $t_2$ (1104) the door handle 104 is considered fully extended.

Extension force sensor 700A at time $t_3$ (1106) receives a second extension force $f_3$ (1106) as a result of a hand pulling outward on the door handle 104 and swing arm 202. To confirm the pulling force is from a hand and not a false input due to mechanical vibration (e.g., objects hitting door, door slamming), some embodiments check if the increased force $f_3$ (1106) on the door handle 104 was greater than a minimum pull threshold $F_1$ (e.g., $f_3>F_1$). Other embodiments may determine whether the second extension force was from a person's hand by comparing the second extension force $f_3$ with both a minimum pull threshold $F_1$ (e.g., $f_3>F_1$) as well as with a minimum pull pulse width $T_0$ (e.g., $\Delta t_{34}>T_0$) (1108). In some embodiments, handle controller 616 confirms a hand has pulled door handle 104 and instructs door controller 604 to unlatch the door. When the door handle 104 eventually retracts at $t_5$(1110), the swing arm is no longer in contact with extension force sensor 700A and the extension force sensor response drops off.

While specific embodiments have been described herein for purposes of illustration, various modifications may be made without departing from the spirit and scope of the disclosure. Accordingly, the disclosure is not limited to the above-described implementations, but instead is defined by the appended claims in light of their full scope of equivalents.

What is claimed is:

1. A method of controlling a door handle to move into an extended position from a vehicle door, comprising:

running a motor operatively coupled to a door handle to facilitate the door handle retracting into the vehicle door, the retraction being performed solely by a biasing member that urges a swing arm coupled to the door handle to retract;

receiving a first retraction force signal response corresponding to a first retraction force applied to a retraction force sensor as the swing arm retracted by the biasing member also retracts into the vehicle door and presses against the retraction force sensor;

instructing the motor operatively coupled to the door handle to stop running when the first retraction force signal indicates the first retraction force is greater than a retraction stop threshold;

receiving a second retraction force signal response corresponding to a second retraction force applied to the retraction force sensor as a result of an inward push on the door handle and the swing arm coupled to the door handle pressing against the retraction force sensor; and instructing the motor operatively coupled to the door handle to facilitate extending the door handle from the retracted position into an extended position from the vehicle door in response to receiving the second retraction force signal response, the extension occurring against the biasing member and being performed solely by running the motor.

2. The method of claim 1, wherein the first retraction force is greater than a retraction stop threshold when a planar surface of the door handle is flush with an outer surface of the vehicle door.

3. The method of claim 1 wherein the first retraction force corresponds to a force imparted by the biasing member.

4. The method of claim 1 wherein the second retraction force from the inward push on the door handle is greater than the first retraction force.

5. The method of claim 1 wherein the second retraction force is compared with a minimum push threshold force and a minimum push pulse width to determine whether the second retraction force is from a person giving an inward push on the door handle.

6. An apparatus that controls a door handle moving into an extended position from a vehicle door, comprising:

a processor capable of executing instructions;

a memory containing instructions when executed cause the processor to run a motor operatively coupled to a door handle to facilitate the door handle retracting into the vehicle door, the retraction being performed solely by a biasing member that urges a swing arm coupled to the door handle to retract, receive a first retraction force signal response corresponding to a first retraction force applied to a retraction force sensor as the swing arm retracted by the biasing member also retracts into the vehicle door and presses against the retraction force sensor, instruct the motor operatively coupled to the door handle to stop running when the first retraction force signal indicates the first retraction force is greater than a retraction stop threshold, receive a second retraction force signal response corresponding to a second retraction force applied to the retraction force sensor as a result of an inward push on the door handle and the swing arm coupled to the door handle pressing against the retraction force sensor, and instruct the motor operatively coupled to the door handle to facilitate extending the door handle from the retracted position into an extended position from the vehicle door in response to receiving the second retraction force signal response, the extension occurring against the biasing member and being performed solely by running the motor.

7. The apparatus that controls the door handle in claim 6, wherein the first retraction force is greater than a minimum stop threshold when a planar surface of the door handle is flush with an outer surface of the vehicle door.

8. The apparatus that controls the door handle in claim 6, wherein the first retraction force corresponds to a force imparted by the biasing member.

9. The apparatus that controls the door handle in claim 6, wherein the second retraction force from the inward push on the door handle is greater than the first retraction force.

10. The apparatus that controls the door handle in claim 6 wherein the second retraction force is compared with a minimum push threshold force and a minimum push pulse width to determine whether the second retraction force is from a person giving an inward push on the door handle.

11. A method of controlling a door handle that unlatches a vehicle door, comprising:

running a motor operatively coupled to a door handle to facilitate the door handle extending from the vehicle door, the extension occurring against a biasing member that biases a swing arm coupled to the door handle and being performed solely by running the motor;

receiving a first extension force signal response corresponding to a first extension force applied to an extension force sensor as the swing arm also extends from inside the vehicle door and comes into contact with the extension force sensor;

instructing the motor operatively coupled to the door handle to stop running when the first extension force signal indicates the first extension force is greater than an extension stop threshold;

receiving a second extension force signal response corresponding to a second extension force applied to the extension force sensor as a result of a pull on the door handle and the swing arm coupled to the door handle pressing against the extension force sensor; and instructing a latch holding the vehicle door shut to unlatch and allow the vehicle door to open in response to receiving the second extension force signal response.

12. The method of claim 11, wherein the first extension force is greater than a minimum stop threshold when a planar surface of the door handle is extended from an outer surface of the vehicle door.

13. The method of claim 11 wherein the second extension force from the pull on the door handle is greater than the first extension force.

14. The method of claim 11 wherein the second extension force is compared with a minimum pull threshold force and a minimum pull pulse width to determine whether the second extension force is from a person giving a pull on the door handle.

15. An apparatus for controlling a door handle that unlatches a vehicle door, comprising:

a processor capable of executing instructions;

a memory containing instructions that when executed on the processor cause the processor to:

run a motor operatively coupled to a door handle to facilitate the door handle extending from the vehicle door, the extension occurring against a biasing member that biases a swing arm coupled to the door handle and being performed solely by running the motor, receive a first extension force signal response corresponding to a first extension force applied to an extension force sensor as the swing arm also extends from inside the vehicle door and comes into contact with the extension force sensor, instruct the motor operatively coupled to the door handle to stop running when the first extension force signal indicates the first extension force is greater than a extension stop threshold, receive a second extension force signal response corresponding to a second extension force applied to the extension force sensor as a result of a pull on the door handle and the swing arm coupled to the door handle pressing against the extension force sensor, and instruct a latch holding the vehicle door shut to unlatch and allow the vehicle door to open in response to receiving the second extension force signal response.

16. The apparatus in claim 15, wherein the first extension force is greater than a minimum stop threshold when a planar surface of the door handle is extended from an outer surface of the vehicle door.

17. The apparatus in claim 15, wherein the second extension force from the pull on the door handle is greater than the first extension force.

18. The apparatus in claim 15, wherein the second extension force is compared with a minimum pull threshold force and a minimum pull pulse width to determine whether the second extension force is from a person giving a pull on the door handle.

19. The method of claim 1, wherein retraction and extension of the door handle is controlled using a four-bar link, the four bar link created by the swing arm and a control arm in that the control arm is off-axis positioned relative to the swing arm.

* * * * *